(12) United States Patent
Carpenter et al.

(10) Patent No.: US 10,021,119 B2
(45) Date of Patent: Jul. 10, 2018

(54) APPARATUS AND METHOD FOR AUTOMATIC HANDLING OF CYBER-SECURITY RISK EVENTS

(71) Applicant: Honeywell International Inc., Morris Plains, NJ (US)

(72) Inventors: Seth G. Carpenter, Phoenix, AZ (US); Kenneth W. Dietrich, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 28 days.

(21) Appl. No.: 14/871,503

(22) Filed: Sep. 30, 2015

(65) Prior Publication Data

US 2016/0234229 A1 Aug. 11, 2016

Related U.S. Application Data

(60) Provisional application No. 62/113,152, filed on Feb. 6, 2015.

(51) Int. Cl.
*H04L 29/06* (2006.01)

(52) U.S. Cl.
CPC ...... *H04L 63/1416* (2013.01); *H04L 63/1433* (2013.01)

(58) Field of Classification Search
CPC ..... H04L 63/00; H04L 63/14; H04L 63/1408; H04L 63/1416; H04L 63/1433;
(Continued)

(56) References Cited

U.S. PATENT DOCUMENTS

| 6,266,773 B1 | 7/2001 | Kisor et al. |
| 7,136,856 B2 | 11/2006 | Birbo et al. |

(Continued)

FOREIGN PATENT DOCUMENTS

| JP | 2008-112284 | 5/2008 |
| KR | 10-2005-0068052 | 7/2005 |

(Continued)

OTHER PUBLICATIONS

Notification of Transmittal of International Search Report and the Written Opinion of the International Searching Authority, or the Declaration dated Jun. 3, 2016 in connection with International Application No. PCT/US2016/016798, 10 pages.

(Continued)

*Primary Examiner* — Eric W Shepperd
(74) *Attorney, Agent, or Firm* — Anthony Miologos (57) ABSTRACT

This disclosure provides an apparatus and method for automatic handling of cyber-security risk events and other risk events. A method includes detecting, by a monitoring system, a first event associated with a device in a computing system. The method includes initializing a risk item corresponding to the first event, and setting the risk item to a full risk value, in response to detecting the event. The method includes determining whether a second event, corresponding to the first event, has been detected. The method includes altering the risk value over time in response to determining that no second event has been detected. The method includes determining if the risk value for the risk item has passed a threshold. The method includes clearing the event in response to the risk value passing the threshold.

15 Claims, 2 Drawing Sheets

(58) Field of Classification Search
CPC ....... H04L 43/00; H04L 43/04; H04L 43/045; H04L 43/16; G06F 21/00; G06F 21/50; G06F 21/55–21/554; G06F 21/577; G06F 2221/21; G06Q 10/00; G06Q 10/06; G06Q 10/063; G06Q 10/0635
See application file for complete search history.

(56) References Cited

U.S. PATENT DOCUMENTS

| | | | |
|---|---|---|---|
| 7,152,105 | B2 | 12/2006 | McClure et al. |
| 7,415,503 | B2 | 8/2008 | Chernoguzov |
| 7,627,891 | B2 | 12/2009 | Williams et al. |
| 7,900,259 | B2 | 3/2011 | Jeschke et al. |
| 7,908,660 | B2 | 3/2011 | Bahl |
| 7,921,459 | B2 | 4/2011 | Houston et al. |
| 7,984,504 | B2 * | 7/2011 | Hernacki ............... H04L 63/14 709/224 |
| 8,020,210 | B2 | 9/2011 | Tippett et al. |
| 8,087,087 | B1 | 12/2011 | Oorschot et al. |
| 8,141,155 | B2 | 3/2012 | Jeschke et al. |
| 8,392,995 | B2 | 3/2013 | Williamson et al. |
| 8,438,643 | B2 | 5/2013 | Wiemer et al. |
| 8,494,974 | B2 | 7/2013 | Watters et al. |
| 8,595,831 | B2 | 11/2013 | Skare |
| 8,595,844 | B2 | 11/2013 | Bahl |
| 8,621,637 | B2 | 12/2013 | Al-Harbi et al. |
| 8,712,596 | B2 | 4/2014 | Scott |
| 8,726,393 | B2 | 5/2014 | Macy et al. |
| 8,763,074 | B2 | 6/2014 | Bechtel et al. |
| 8,769,412 | B2 | 7/2014 | Gill et al. |
| 8,776,168 | B1 | 7/2014 | Gibson et al. |
| 8,806,632 | B2 | 8/2014 | Stefanidakis et al. |
| 8,856,936 | B2 | 10/2014 | Datta Ray et al. |
| 9,166,999 | B1 | 10/2015 | Kulkarni et al. |
| 9,373,267 | B2 | 6/2016 | Sadeh-Koniecpol et al. |
| 9,401,926 | B1 | 7/2016 | Dubow et al. |
| 2002/0161877 | A1 * | 10/2002 | Stevenson ............ H04Q 3/0075 709/223 |
| 2003/0126472 | A1 | 7/2003 | Banzhof |
| 2003/0154393 | A1 | 8/2003 | Young |
| 2004/0030531 | A1 | 2/2004 | Miller et al. |
| 2004/0193907 | A1 | 9/2004 | Patanella |
| 2005/0010821 | A1 | 1/2005 | Cooper et al. |
| 2005/0144480 | A1 | 6/2005 | Kim et al. |
| 2005/0193430 | A1 | 9/2005 | Cohen et al. |
| 2005/0283751 | A1 | 12/2005 | Bassin et al. |
| 2006/0010493 | A1 | 1/2006 | Piesco et al. |
| 2006/0064740 | A1 * | 3/2006 | Kelley ................. G06F 21/577 726/3 |
| 2006/0085852 | A1 | 4/2006 | Sima |
| 2006/0101517 | A1 | 5/2006 | Banzhof et al. |
| 2006/0117388 | A1 | 6/2006 | Nelson et al. |
| 2006/0123482 | A1 | 6/2006 | Aaron |
| 2006/0126501 | A1 | 6/2006 | Ramaswamy |
| 2006/0174121 | A1 | 8/2006 | Omae et al. |
| 2006/0206941 | A1 | 9/2006 | Collins |
| 2006/0239645 | A1 | 10/2006 | Curtner et al. |
| 2007/0067846 | A1 | 3/2007 | McFarlane et al. |
| 2007/0094491 | A1 | 4/2007 | Teo et al. |
| 2007/0143851 | A1 | 6/2007 | Nicodemus et al. |
| 2007/0157195 | A1 * | 7/2007 | Gaa-Frost ................. G06F 8/60 717/174 |
| 2007/0223398 | A1 | 9/2007 | Luo et al. |
| 2007/0226794 | A1 | 9/2007 | Howcroft et al. |
| 2007/0289008 | A1 | 12/2007 | Andreev et al. |
| 2008/0016339 | A1 | 1/2008 | Shukla |
| 2008/0047016 | A1 | 2/2008 | Spoonamore |
| 2008/0141377 | A1 | 6/2008 | Dunagan et al. |
| 2008/0172347 | A1 | 7/2008 | Bernoth et al. |
| 2008/0189788 | A1 | 8/2008 | Bahl |
| 2008/0209567 | A1 | 8/2008 | Lockhart et al. |
| 2008/0229420 | A1 | 9/2008 | Jeschke et al. |
| 2008/0235196 | A1 | 9/2008 | Broussard et al. |
| 2008/0262822 | A1 | 10/2008 | Hardwick et al. |
| 2009/0024663 | A1 | 1/2009 | McGovern |
| 2009/0106701 | A1 * | 4/2009 | Yalamanchi ...... G06F 17/30572 715/841 |
| 2009/0121860 | A1 | 5/2009 | Kimmel et al. |
| 2009/0228316 | A1 | 9/2009 | Foley et al. |
| 2010/0121929 | A1 | 5/2010 | Lin |
| 2010/0125911 | A1 | 5/2010 | Bhaskaran |
| 2010/0125912 | A1 | 5/2010 | Greenshpon et al. |
| 2010/0242114 | A1 | 9/2010 | Bunker et al. |
| 2010/0318512 | A1 | 12/2010 | Ludwig |
| 2010/0324945 | A1 | 12/2010 | Hessing |
| 2011/0039237 | A1 | 2/2011 | Skare |
| 2011/0126111 | A1 | 5/2011 | Gill et al. |
| 2011/0162073 | A1 | 6/2011 | Jeschke et al. |
| 2011/0231412 | A1 | 9/2011 | Kariv |
| 2011/0270791 | A1 * | 11/2011 | Bester ................... G06Q 50/06 706/47 |
| 2011/0288692 | A1 | 11/2011 | Scott |
| 2012/0011077 | A1 | 1/2012 | Bhagat |
| 2012/0011590 | A1 | 1/2012 | Donovan |
| 2012/0109834 | A1 | 5/2012 | Bongiovanni et al. |
| 2012/0180133 | A1 | 7/2012 | Al-Harbi et al. |
| 2012/0224057 | A1 | 9/2012 | Gill et al. |
| 2012/0255003 | A1 | 10/2012 | Sallam |
| 2012/0268269 | A1 * | 10/2012 | Doyle ................. G08B 21/0202 340/539.13 |
| 2013/0031037 | A1 | 1/2013 | Brandt et al. |
| 2013/0067558 | A1 | 3/2013 | Markham et al. |
| 2013/0111275 | A1 | 5/2013 | Ganesan et al. |
| 2013/0135118 | A1 * | 5/2013 | Ricci ......................... G06F 9/54 340/932.2 |
| 2013/0160119 | A1 | 6/2013 | Sartin et al. |
| 2013/0174259 | A1 | 7/2013 | Pearcy et al. |
| 2013/0185191 | A1 * | 7/2013 | Ganor .................... G06Q 40/02 705/39 |
| 2013/0204783 | A1 * | 8/2013 | Klose .................. G06Q 20/108 705/42 |
| 2013/0212685 | A1 | 8/2013 | Kelley et al. |
| 2013/0239177 | A1 | 9/2013 | Sigurdson et al. |
| 2013/0247207 | A1 | 9/2013 | Hugard et al. |
| 2013/0283336 | A1 | 10/2013 | Macy et al. |
| 2013/0298244 | A1 | 11/2013 | Kumar et al. |
| 2013/0326002 | A1 | 12/2013 | Leuoth et al. |
| 2013/0347107 | A1 | 12/2013 | Williams et al. |
| 2014/0007244 | A1 | 1/2014 | Martin et al. |
| 2014/0082738 | A1 | 3/2014 | Bahl |
| 2014/0130121 | A1 | 5/2014 | Lin |
| 2014/0137257 | A1 | 5/2014 | Martinez et al. |
| 2014/0165128 | A1 | 6/2014 | Auvenshine et al. |
| 2014/0215555 | A1 | 7/2014 | Barton et al. |
| 2014/0236668 | A1 | 8/2014 | Young et al. |
| 2014/0283083 | A1 | 9/2014 | Gula et al. |
| 2014/0289796 | A1 | 9/2014 | Moloian et al. |
| 2014/0297495 | A1 | 10/2014 | Dalai et al. |
| 2014/0305525 | A1 | 10/2014 | Le Moing et al. |
| 2014/0337086 | A1 | 11/2014 | Asenjo et al. |
| 2014/0359777 | A1 * | 12/2014 | Lam ...................... G06F 21/577 726/25 |
| 2015/0018984 | A1 | 1/2015 | Williams et al. |
| 2015/0032839 | A1 | 1/2015 | Serokurov et al. |
| 2015/0033323 | A1 | 1/2015 | Oliphant et al. |
| 2015/0033337 | A1 | 1/2015 | Baikalov et al. |
| 2015/0163242 | A1 | 6/2015 | Laidlaw et al. |
| 2015/0213369 | A1 | 7/2015 | Brandt et al. |
| 2015/0242769 | A1 | 8/2015 | Kezeu |
| 2015/0264061 | A1 * | 9/2015 | Ibatullin ................ H04L 63/145 726/23 |
| 2015/0281287 | A1 | 10/2015 | Gill et al. |
| 2015/0370983 | A1 | 12/2015 | Vial et al. |
| 2016/0011921 | A1 | 1/2016 | Rao et al. |
| 2016/0164892 | A1 | 6/2016 | Satish et al. |
| 2016/0173359 | A1 * | 6/2016 | Brenner ................... G06F 19/00 600/301 |
| 2016/0205126 | A1 | 7/2016 | Boyer et al. |
| 2016/0205143 | A1 | 7/2016 | Bryson et al. |
| 2016/0212165 | A1 | 7/2016 | Singla et al. |

(56) References Cited

U.S. PATENT DOCUMENTS

| | | |
|---|---|---|
| 2016/0217160 A1 | 7/2016 | Croft |
| 2016/0330222 A1 | 11/2016 | Brandt et al. |
| 2017/0235848 A1* | 8/2017 | Van Dusen ....... G06F 17/30979 705/12 |

FOREIGN PATENT DOCUMENTS

| | | |
|---|---|---|
| KR | 10-1060277 | 8/2011 |
| KR | 10-2014-0097691 | 8/2014 |
| WO | WO 2013/166126 A1 | 11/2013 |

OTHER PUBLICATIONS

Notification of Transmittal of International Search Report and the Written Opinion of the International Searching Authority, or the Declaration dated May 13, 2016 in connection with International Application No. PCT/US2016/015890, 11 pages.

Notification of Transmittal of International Search Report and the Written Opinion of the International Searching Authority, or the Declaration dated May 13, 2016 in connection with International Application No. PCT/US2016/016098, 12 page.

Notification of Transmittal of International Search Report and the Written Opinion of the International Searching Authority, or the Declaration dated Jun. 13, 2016 in connection with International Application No. PCT/US2016/016496, 12 pages.

Notification of Transmittal of International Search Report and the Written Opinion of the International Searching Authority, or the Declaration dated Jun. 3, 2016 in connection with International Application No. PCT/US2016/016399, 11 pages.

Notification of Transmittal of International Search Report and the Written Opinion of the International Searching Authority, or the Declaration dated Jun. 3, 2016 in connection with International Application No. PCT/US2016/016265, 10 pages.

Notification of Transmittal of International Search Report and the Written Opinion of the International Searching Authority, or the Declaration dated Jun. 2, 2016 in connection with International Application No. PCT/US2016/015952, 11 pages.

Notification of Transmittal of International Search Report and the Written Opinion of the International Searching Authority, or the Declaration dated May 18, 2016 in connection with International Application No. PCT/US2016/016159, 11 pages.

Gerhards, R.; "The Syslog Protocol"; Network Working Group; Adiscon GmbH; Mar. 2009; 38 pages.

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe, Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.

"Honeywell Industrial Cyber Security Overview and Managed Industrial Cyber Security Services"; HPS; Jun. 4, 2014; 19 pages.

"Information Technology—Security Techniques—Information Security Risk Management"; Bio Standards Publication; BS ISO/IEC 27005;2011; 80 pages.

"Risk Management and Critical Infrastructure Protection: Assessing, Integrating, and Managing Threats, Vulnerabilities and Consequences"; CRS Rpt for Congress; RL32561; Feb. 4, 2005; 28 pages.

"Security for Industrial Automation and Control Systems Part 2-3: Patch Management in the IACS Environment"; ISA-TR62443-2-3-2015; Jul. 1, 2015; 18 pages.

"Design and Planning Guide for System Center 2012—Operations Manager"; System Center 2012; Microsoft Corporation; Apr. 2012; 13 pages.

Hutzler, D., "How to Prevent Attacks on Air Gapped Networks," OPSWAT Blog, https://www.opswat.com/blog/how-prevent-attacks-air-gapped-networks, Jan. 16, 2015, 5 pages.

Marshall, R., "Guest Post: How to Configure Alerts in System Center 2012," https://blogs.technet.microsoft.com/uktechnet/2013/04/08/guest-post-how-to-configure-alerts-in-system-center-2012/, Apr. 8, 2013, 9 pages.

"Symantec™ Control Compliance Suite 11.0 User Guide," Symantec Corporation, https://www.scribd.com/document/126556709/CCS-User-Guide; 2012, 952 pages.

"Configuring Symantec Vulnerability Assessment 1.0 for Network Audits," TECH111985, https://support.symantec.com/en_US/article.TECH111985.html, Jan. 16, 2003, 6 pages.

"iPost: Implementing Continuous Risk Monitoring at the Department of State," Enterprise Network Management, U.S. Department of State, Information Resource Management Office of Information Assurance, Version 1.5, May 14, 2010, 28 pages.

U.S. Appl. No. 14/871,695, Non-Final Office Action dated Dec. 16, 2016, 11 pages.

U.S. Appl. No. 14/871,521, Non-Final Office Action dated Dec. 19, 2016, 11 pages.

U.S. Appl. No. 14/871,855, Non-Final Office Action dated Jan. 18, 2017, 12 pages.

U.S. Appl. No. 14/871,732, Non-Final Office Action dated Dec. 30, 2016, 36 pages.

U.S. Appl. No. 14/871,547, Non-Final Office Action dated Dec. 16, 2016, 12 pages.

U.S. Appl. No. 14/871,605, Non-Final Office Action dated Dec. 19, 2016, 13 pages.

U.S. Appl. No. 14/871,814, Non-Final Office Action dated Dec. 16, 2016, 7 pages.

U.S. Appl. No. 14/871,136, Non-Final Office Action dated Dec. 2, 2016, 18 pages.

U.S. Appl. No. 14/705,379, Non-Final Office Action dated Feb. 7, 2017, 7 pages.

Foreign Communication From a Related Counterpart Application, PCT Application No. PCT/US2016/028553, International Search Report and Written Opinion dated Apr. 21, 2016, 10 pages.

\* cited by examiner

APPARATUS AND METHOD FOR AUTOMATIC HANDLING OF CYBER-SECURITY RISK EVENTS

CROSS-REFERENCE TO RELATED APPLICATION

This application claims the benefit of the filing date of U.S. Provisional Patent Application 62/113,152, filed Feb. 6, 2015, which is hereby incorporated by reference.

TECHNICAL FIELD

This disclosure relates generally to network security. More specifically, this disclosure relates to an apparatus and method for automatic handling of cyber-security risk events.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides an apparatus and method for automatic handling of cyber-security risk events and other risk events. A method includes detecting, by a monitoring system, a first event associated with a device in a computing system. The method includes initializing a risk item corresponding to the first event, and setting the risk item to a full risk value, in response to detecting the event. The method includes determining whether a second event, corresponding to the first event, has been detected. The method includes altering the risk value over time in response to determining that no second event has been detected. The method includes determining if the risk value for the risk item has passed a threshold. The method includes clearing the event in response to the risk value passing the threshold.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
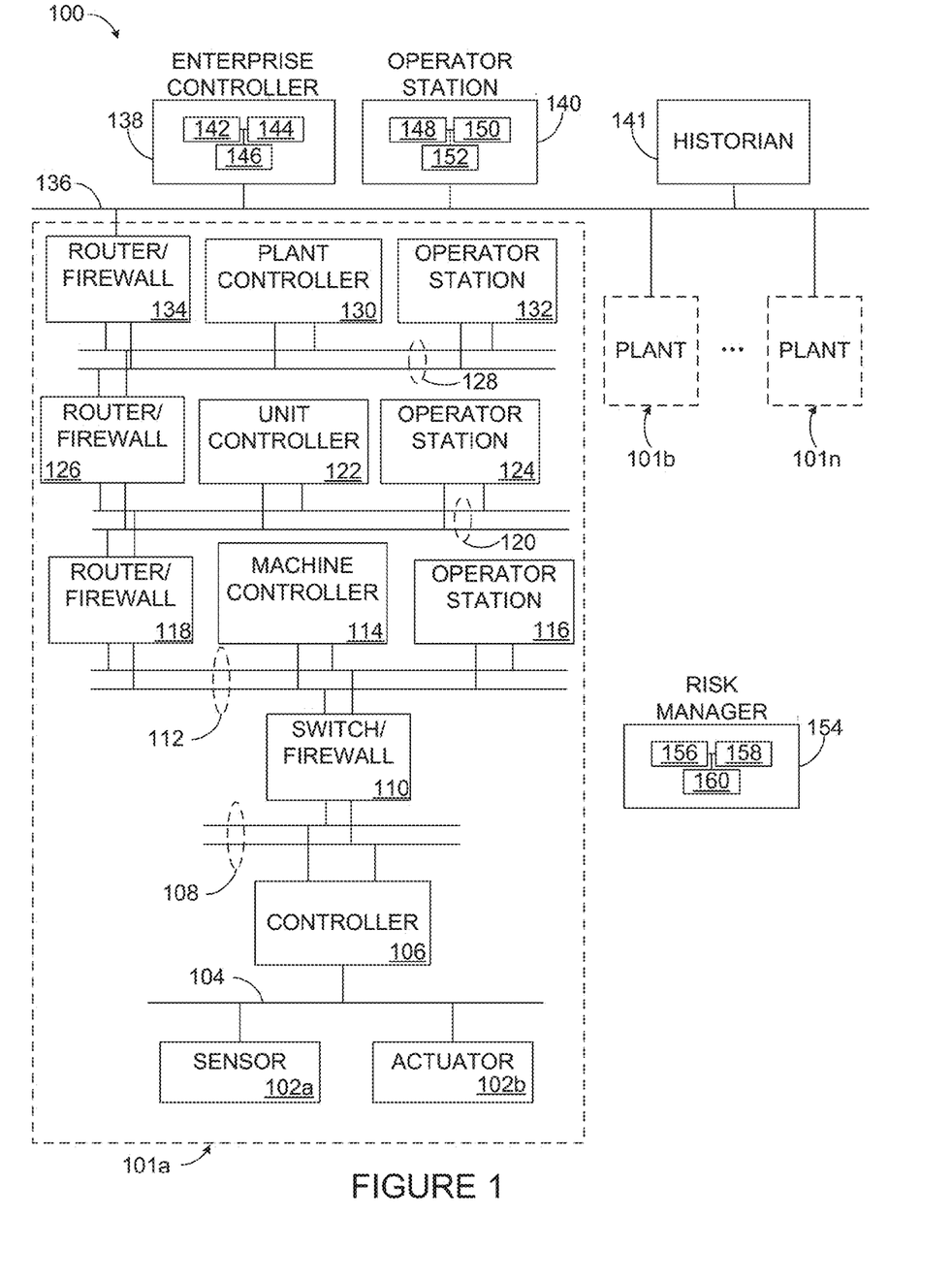
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. However, in many instances, operators do not have a complete understanding or inventory of all equipment running at a particular industrial site. As a result, it is often difficult to quickly determine potential sources of risk to a control and automation system.

Moreover, process control engineers are typically tasked with keeping industrial processes running smoothly, and new products often introduce new maintenance and administration tasks to their already heavy workload. Cybersecurity risk management is no different in that, although risk management information helps users to secure a system, it also introduces the users to a new (possibly constant) stream of information.

Disclosed embodiments include solutions that evaluate potential vulnerabilities in various systems, prioritize the vulnerabilities based on risk to an overall system, and guide a user to mitigate the vulnerabilities. This is accomplished, in some embodiments, using a risk manager 154. Risk manager 154 can be implemented using, for example operator station 116, operator station 124, operator station 132, operator station 140, or other controller or data processing system configured to interact with the elements of system 100. Each operator station discussed herein can include such structural elements as one or more processors or controllers, a memory, a non-volatile storage device such as a hard drive or otherwise, displays, user input devices such as keyboards, mice, or touchscreens, and wireless or wired communication interfaces.

Among other things, the risk manager 154 balances providing useful cyber-security information to a user with minimizing the user's required tasks. The risk manager 154 includes any suitable structure that supports automatic handling of cyber-security risk events. In this example, the risk manager 154 includes one or more processing devices 156; one or more memories 158 for storing instructions and data used, generated, or collected by the processing device(s) 156; and at least one network interface 160 that can be implemented as a wired or wireless interface. Each processing device 156 could represent a microprocessor, microcontroller, digital signal processor, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions.

In some embodiments, there are two types of risk items that can be reported to users: status items and events. Status items denote risk items that have definite states (such as on/off, enabled/disabled, or installed/not installed) and are often easier to manage. For example, if in a bad state, such as a fault state, failure, or other state that indicates that a process or device is not behaving normally, a status item may stay active in the risk manager 154 until the underlying cause is addressed. As a particular example, if tracking whether or not antivirus software is running on a system or controller disclosed herein, the risk manager 154 can track the services that the antivirus program uses. If the services are running and healthy, it is not considered a risk; if they are not running, a risk is indicated and the status item stays active until the services are running again.

Events denote risk items that identify the occurrence of particular conditions or actions, which are typically harder for users to manage. Events typically have a start time or other time when the event occurred, but may not provide any indication whether an underlying condition has cleared or a clear condition may simply not exist. An example event is an authentication failure, such as when someone provides an incorrect password during a login. An operator could see a notification of an authentication failure, but as a one-time event it does not "clear" like a status item typically would.

In traditional event management systems, events need to be acknowledged manually by an authorized user if the user is to be effectively alerted at all, since the event is typically transient. To avoid the need to acknowledge events manually, in accordance with disclosed embodiments, the risk manager 154 allows a risk value associated with an event or other risk item to decay over time if it does not reoccur. If the event does reoccur, the risk value can jump back to a base value, and the decay period can begin again. If an event occurs frequently or continuously, risk manager 154 can consider and respond to such a condition, such as by raising the risk value above the starting base value.

By allowing certain events to decay, intermittent events can show up long enough for users of a system to see the events, but the users may need to take no additional steps to clear the events. More serious events by their nature can continue to occur and will not be cleared. To return to the authentication failure example, a person mistyping a password a few times could appear as several isolated events that do not reoccur and are soon cleared. However, a brute-force attack on a system (where an attacker attempts to use many different passwords in quick succession hoping to "guess" the correct password) could be seen as a constant stream of events that remain active until the attack is addressed in some way.

One disclosed implementation of the decay function uses a linear decay model. Note that other decay models, such as exponential decay, can also be used in various embodiments. In the linear decay model, a base risk score is denoted R, a decay period is denoted P, and an amount of time that has passed since an event occurred is denoted t. An instantaneous risk value can be calculated as a function of t with a piecewise function, such as:

$$\text{For } t<P: \text{Risk}=f(t)=R*(1-(t/P))$$

$$\text{For } t>=P: \text{Risk}=f(t)=0$$

The value of P is carefully chosen—if it is too long, events can build up and clutter user visibility; if it is too short, an event could occur a single time and disappear before being seen by a user. In some embodiments, various steps could be taken to help with this issue. For instance, a default decay period could be set to a relatively long period of time (such as three days) so that events occurring over a weekend would still be active on the first day of the work week. Also, users could customize decay periods to values appropriate for their particular policies.

Figure 2:
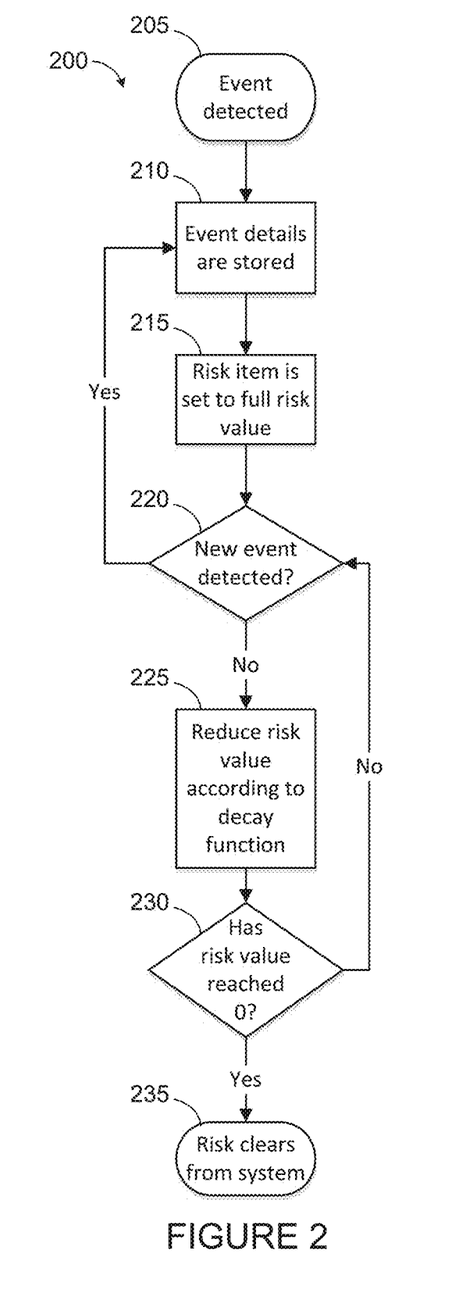
FIG. 2 illustrates an example method for automatic handling of cyber-security risk events according to this disclosure.

FIG. 2 illustrates an example of an event processing and decay process in accordance with disclosed embodiments, as performed by a risk manager, operator station, or other controller, computing system, or data processing system configured to perform processes as described herein, referred to generically as the "monitoring system" below, where a processing device of the monitoring system is configured to perform each of the actions described below. Method 200 can automatically handle of cyber-security risk events according to this disclosure. Among other operations, the risk manager 154 can identify cyber-security threats and issues associated with a control and automation system 100, and the risk manager 154 can generate notifications to users in one or various forms, including but not limited to an alert display, reports, emails, text messages, alerts, and others. While the risk manager 154 can provide a significant amount of new information about cyber-security risks to a system, the risk manager 154 also represents another information source for users to manage.

The monitoring system detects a first event (205). The first event can be any occurrence of a particular condition or action for which an operator or other user should be alerted, including specifically (but not limited to) system-security events such as failed login or other authorization attempts, unauthorized software execution attempts, network intrusion attempts, and others, and the first event is generally associated with a specific device with which the monitoring system is in communication. This can include obtaining information identifying the first event, where the first event is associated with a device in a computing system and identifies a cyber-security risk associated with the device.

The monitoring system can store the event details for the first event (210). Event details can include, for example, the type of event, the time and date of the event, the result of the event (including any monitoring system response, etc.), the system, device, or component that generated the event, any other information identifying the first event, or any other details that would be informative to the operator.

In response to detecting the first event, the monitoring system initializes a risk item corresponding to the first event and sets the risk item to a full risk value (215). The full risk value can be any value that is understood to represent a "full risk" of a new event, such as 100. As part of 215, the monitoring system can also display an alert or send a notification as described herein, indicating the risk item and its risk value or any other event details. This can include defining a risk value associated with the first event, where the first event remains active until the risk value passes a threshold as described herein.

The monitoring system determines if a second event (or further event), corresponding to the first event, has been detected (220). The second event can correspond to the first event by, for example, being a repeat of the first event, being of the same type of event as the first event (e.g., a second, but not identical, failed login attempt), being generated by the same process, system, or device as the first event, or otherwise, which can be selected or specified by the user. If such a second corresponding event is detected, the process returns to 210, processing the second event as it did the first event. In some embodiments, if multiple second (or further) events corresponding to the first event are detected, the system can alter the risk value to a value that indicates a significant ongoing risk, for example a value that is higher than the full risk value.

The monitoring system alters the risk value over time. For example, if no second event is detected, the monitoring system reduces the risk value according to a decay function as described herein (225). As part of 215, the monitoring system can also display an alert or send a notification as described herein, indicating the risk item and its reduced risk value or any other event details. The risk-value reduction can take place at specified intervals (e.g., once per hour) so that the risk value is gradually reduced over a predetermined time period (e.g., three days).

The monitoring system determines if the risk value for the risk item has reached or passed zero (or other predetermined threshold) (230). If not, the process returns to 220 to continue to detect events.

In response to determining that the risk value for the risk item has reached or passed zero or other predetermined threshold, then the monitoring system clears the risk item from the monitoring system (235). As part of 235, the monitoring system can also display an alert or send a notification as described herein, indicating the risk item and its risk value or any other event details, and indicating that the risk item has been cleared.

Of course, the process described with respect to the example of FIG. 2 is for a single event and its corresponding events, where typical implementations will be processing many events at the same time. In such cases, each new event is processed at 220 for any number of previously-detected first events to find a "match" where the new event corresponds to a previously-detected first event.

In some embodiments, a web-based application programming interface (API) can be used to support the event decay process illustrated in FIG. 2. In these embodiments, a configuration file for the API can be used to define various fields related to the decay algorithm that can be used to obtain input from users. For example, in particular embodiments, the following items could be defined in the configuration file:

SecurityEventCacheAbsolutePeriodSeconds—an absolute expiration period in seconds;

SecurityEventCacheSlidingPeriodSeconds—a sliding expiration period in seconds;

SecurityEventCacheExpirationPolicy—the expiration policy to use (such as Sliding or Absolute); and SecurityEventCacheForceEventDecay—a flag indicating whether to force the decay (RiskFactor set to zero) of a security status event when it expires.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

Although FIG. 2 illustrates one example of method 200 for automatic handling of cyber-security risk events, various changes may be made to FIG. 2. For example, various steps shown in FIG. 2 could overlap, occur in parallel, occur in a different order, or occur any number of times. Also, while not shown, an additional loop in the method 200 could be used to increase the risk value if an event occurs repeatedly (such as more than a threshold number of times or at more than a threshold frequency). In addition, the threshold value of "0" in FIG. 2 is for illustration only, and any other suitable threshold value(s) could be used (including different thresholds for different types of events).

Note that the risk manager 154 here could use or operate in conjunction with any combination or all of various features described in the following previously-filed and concurrently-filed patent applications (all of which are hereby incorporated by reference):

U.S. patent application Ser. No. 14/482,888 entitled "DYNAMIC QUANTIFICATION OF CYBER-SECURITY RISKS IN A CONTROL SYSTEM";

U.S. Provisional Patent Application No. 62/036,920 entitled "ANALYZING CYBER-SECURITY RISKS IN AN INDUSTRIAL CONTROL ENVIRONMENT";

U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695 of like title filed concurrently herewith;

U.S. Provisional Patent Application No. 62/113,221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521 of like title filed concurrently herewith;

U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855 of like title filed concurrently herewith;

U.S. Provisional Patent Application No. 62/113,186 entitled "INFRASTRUCTURE MONITORING TOOL FOR COLLECTING INDUSTRIAL PROCESS CONTROL AND AUTOMATION SYSTEM RISK DATA" and corresponding non-provisional U.S. patent application Ser. No. 14/871,732 of like title filed concurrently herewith;

U.S. Provisional Patent Application No. 62/113,165 entitled "PATCH MONITORING AND ANALYSIS" and corresponding non-provisional U.S. patent application Ser. No. 14/871,921 of like title filed concurrently herewith;

U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605 of like title filed concurrently herewith;

U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814 of like title filed concurrently herewith;

U.S. Provisional Patent Application No. 62/114,937 entitled "APPARATUS AND METHOD FOR TYING CYBER-SECURITY RISK ANALYSIS TO COMMON RISK METHODOLOGIES AND RISK LEVELS" and corresponding non-provisional U.S. patent application Ser. No. 14/871,136 of like title filed concurrently herewith; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547 of like title filed concurrently herewith.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    detecting, by a monitoring system, a first event associated with a device in a computing system;
    in response to detecting the event, initializing a risk item corresponding to the first event, by the monitoring system, and setting the risk item to a full risk value;
    determining, by the monitoring system, whether a second event, corresponding to the first event, has been detected, wherein the second event corresponds to the first event when the second event is a repeat of the first event, is a same type of event as the first event, or is generated by a same process, system, or device as the first event;
    in response to determining, by the monitoring system, that no second event has been detected, reducing the risk value over time;
    in response to determining, by the monitoring system, that multiple corresponding second events have been detected, increasing the risk value to value that is greater than the full risk value;
    altering, by the monitoring system, when no second event has been detected, the risk value by reducing the risk value according to a decay function wherein the decay function is defined as:

For $t<P$:Risk=$R*(1-(t/P))$

For $t>=P$:Risk=0, where Risk represents an adjusted risk value, R represents the full risk value, P represents a decay period of time, and t represents an amount of time that has passed since the first event occurred was detected;
    determining, by the monitoring system, if the risk value for the risk item has passed a threshold; and
    clearing the event, by the monitoring system, in response to the risk value passing the threshold.

2. The method of claim 1, further comprising storing event details for the first event.

3. The method of claim 1, further comprising, in response to determining that a single second event has been detected, not altering the risk value.

4. The method of claim 1, wherein, the risk value that is greater than the full risk value indicates a significant ongoing risk.

5. The method of claim 1, further comprising displaying an alert that indicates the risk item and the risk value.

6. The method of claim 1, wherein a user specifies whether the second event is the repeat of the first event, is the same type of event as the first event, or is generated by the same process system, or device as the first event.

7. A monitoring system, further comprising:
    a processing device;
    a memory; and
    a network interface,
    wherein the processing device is configured to:
        detect a first event associated with a device in a computing system;
        in response to detecting the event, initialize a risk item corresponding to the first event and set the risk item to a full risk value;
        determine whether a second event, corresponding to the first event, has been detected, wherein the second event corresponds to a first event when the second event is a repeat of the first event, is a same type of event as the first event, or is generated by a same process, system, or device as the first event;
        in response to determining that no second event has been detected, alter the risk value over time;
        in response to determining that no second event has been detected, increase the risk value to a value that is greater than the full risk value;
        altering, by the monitoring system, when no second event has been detected, the risk value by reducing the risk value according to a decay function wherein the decay function is defined as:

For $t<P$:Risk=$R*(1-(t/P))$

For $t>=P$:Risk=0, where Risk represents an adjusted risk value, R represents the full risk value, P represents a decay period of time, and t represents an amount of time that has passed since the first event occurred was detected;

determine if the risk value for the risk item has passed a threshold; and clear the event in response to the risk value passing the threshold.

8. The monitoring system of claim 7, wherein the monitoring system also stores event details for the first event.

9. The monitoring system of claim 7, wherein, in response to determining that a single second event has been detected, the monitoring system does not alter the risk value.

10. The monitoring system of claim 7, wherein, the risk value that is greater than the full risk value indicates a significant ongoing risk.

11. The monitoring system of claim 7, wherein the monitoring system displays an alert that indicates the risk item and the risk value.

12. A non-transitory computer-readable medium encoded with computer readable program code that, when executed, causes a monitoring system to:

detect a first event associated with a device in a computing system;

in response to detecting the event, initialize a risk item corresponding to the first event and set the risk item to a full risk value;

determine whether a second event, corresponding to the first event, has been detected, wherein the second event corresponds to the first event when the second event is a repeat of the first event, is a same type of event as the first event, or is generated by a same type of event as the first event, or is generated by same process, system, or device as the first event;

in response to determining that no second event has been detected, alter the risk value over time;

in response to determining that multiple corresponding second events have been detected, increase the risk value to a value that is greater than the full risk value;

executing by the computer readable program code, when no second event has been detected, to reduce the risk value by reducing the risk value according to a decay function wherein the decay function is defined as:

For $t<P$:Risk=$R*(1-(t/P))$

For $t>=P$:Risk=0, where Risk represents an adjusted risk value, R represents the full risk value, P represents a decay period of time, and t represents an amount of time that has passed since the first event occurred was detected;

determine if the risk value for the risk item has passed a threshold; and clear the event in response to the risk value passing the threshold.

13. The non-transitory computer-readable medium of claim 12, wherein the monitoring system also stores event details for the first event.

14. The non-transitory computer-readable medium of claim 12, wherein, in response to determining that the second event has been detected, the monitoring system does not alter the risk value.

15. The non-transitory computer-readable medium of claim 12, wherein, in response to determining that multiple second events have been detected, the monitoring system alters the risk value to a value that indicates a significant ongoing risk.

* * * * *